United States Patent [19]

Robinson et al.

[11] Patent Number: 6,057,002
[45] Date of Patent: May 2, 2000

[54] PIPE-COATING METHOD AND PRODUCT

[75] Inventors: Ian Robinson; Martin Hutchinson, both of Thirsk, United Kingdom

[73] Assignee: E. Wood Limited, United Kingdom

[21] Appl. No.: 09/080,590

[22] Filed: May 18, 1998

[51] Int. Cl.$^7$ .............. B05D 3/12; B05D 7/14; B05D 1/38
[52] U.S. Cl. ............. 427/409; 427/290; 427/292; 427/327; 427/412.3
[58] Field of Search ................. 427/409, 142, 427/292, 327, 239, 412.3, 290

[56] References Cited

U.S. PATENT DOCUMENTS

| | | | |
|---|---|---|---|
| 3,689,311 | 9/1972 | Loeffler et al. | 427/292 |
| 3,973,056 | 8/1976 | Fessler et al. | 427/136 |
| 4,115,614 | 9/1978 | Martin, Jr. | 428/220 |
| 4,126,718 | 11/1978 | Christie et al. | 427/286 |
| 4,209,555 | 6/1980 | Stewart | 427/292 |
| 4,267,081 | 5/1981 | Seneker | 525/7 |
| 4,543,366 | 9/1985 | Smith | 427/236 |
| 4,632,959 | 12/1986 | Nagano | 525/70 |
| 5,178,902 | 1/1993 | Wong et al. | 427/470 |
| 5,256,226 | 10/1993 | Marzola et al. | 427/142 |
| 5,525,676 | 6/1996 | Kitayama et al. | 525/240 |
| 5,561,208 | 10/1996 | Takahashi et al. | 526/281 |
| 5,792,518 | 8/1998 | Gibson et al. | 427/142 |
| 5,811,489 | 9/1998 | Shirai et al. | 525/66 |

FOREIGN PATENT DOCUMENTS 2165772A  4/1986  United Kingdom .

*Primary Examiner*—Diana Dudash
*Attorney, Agent, or Firm*—Thompson Hine & Flory LLP

[57] ABSTRACT

A method of protecting from corrosion the junction between adjoining plastics coated, metal pipes, in a pipeline installation or the like, comprising roughening the exposed surface of the plastics coating on either side of the junction region, applying a primer over the abraded region of the plastics coating, allowing or causing the primer to cure or dry, and subsequently applying over the said junction region and over the regions primed with said primer, a protective top coat.

8 Claims, No Drawings

PIPE-COATING METHOD AND PRODUCT

THIS INVENTION relates to the application of protective coatings to items subject to corrosion, and particularly, but not exclusively, to pipelines such as gas pipelines.

The oil and gas industry have used a variety of materials to protect the external surfaces of steel pipelines for a number of years.

Quite recently, the use of polypropylene and polyethylene has become increasingly common for the external protection of pipelines particularly where the lines involved are to be buried on land rather than underwater.

The use of polyethylene and polypropylene coating systems is growing on a worldwide basis due to the advantages which these systems confer and there is little doubt that the current increases in usage will continue in the foreseeable future.

The polyethylene or the polypropylene system usually involves blast cleaning the pipeline, followed by application of a fusion bonded epoxy (FBE) coating, followed by application of polyethylene or polypropylene onto the fusion bonded epoxy at a thickness of approximately 2 mm.

The advantage of the above system lies in the fact that the fusion bonded epoxy coating provides good corrosion protection to the underlying steel pipeline, and the polyethylene or the polypropylene layer provides excellent abrasion and impact resistance and acts as a complete barrier to the underlying pipe surface.

In the construction of a pipeline using pipe lengths coated as described, the treated pipe lengths are transported to site and are welded together on site to create a continuous pipe line.

Normally pipe lengths are around 12 meters in length and therefore weld joints occur every 12 meters along a particular pipeline.

When a welding operation is to be carried out, the pipe ends have to be free of all coating and in practice, a region of approximately 10 cms from the end of each pipe is left uncoated, enabling welding to be carried out on site.

After the welding has been completed, the main problem facing the pipeline contractor is the protection of the weld areas.

In practice, the normal protection method involves the use of a heat shrink sleeve fitted over the pipe joint to extend over and protect the uncoated area and further to overlap the polypropylene or the polyethylene-coated surface.

However, such heat shrink sleeves are not an entirely satisfactory means of protecting the welded pipe joints, inter alia because polyethylene and polypropylene are notoriously difficult to bond other materials to.

It is an object of the present invention to provide an improved method of protecting, inter alia, the junctions between adjacent pipe lengths in a pipeline.

According to one aspect of the invention, there is provided a method of protecting from corrosion the junction between adjoining plastics coated, metal pipes, in a pipeline installation or the like, comprising roughening the exposed surface of the plastics coating on either side of the junction region, applying a primer over the abraded region of the plastics coating, allowing or causing the primer to cure or dry, and subsequently applying over the said junction region and over the regions primed with said primer, a protective top coat.

According to another aspect of the invention, there is provided a method of protecting from corrosion the junction between adjoining polyethylene or polypropylene coated, metal pipes, in a pipeline installation or the like, comprising roughening the exposed surface of the polyethylene or polypropylene coating on either side of the junction region, applying a polyolefin primer over the abraded region of the plastics coating, allowing or causing the primer to cure or dry, and subsequently applying over the said junction region and over the regions primed with said primer, a protective polyurethane top coat.

An embodiment of the invention is described in more detail below.

In the embodiment to be described, the invention was applied to the protection of welded joints between adjacent pipe lengths of a pipe line, each said pipe length comprising a steel pipe which had been given a protective coating by abrasive blast cleaning of the surface of the steel pipe, followed by application of a fusion bonded epoxy (FBE) coating, to which had been applied, in turn, a layer, approximately 2 mm thick, of polyethylene or polypropylene. Such pipe lengths, coated in this manner, are known per se, as noted above. As such coated pipe lengths are intended to be connected end-to-end by welding, and as, for such welding, it is necessary for the steel in the region of the welds to be uncoated, in manufacture of such pipe lengths a region at each end of each such pipe length is left uncoated, namely a region extending for some 10 cm along the pipe section from the respective free end.

After welding adjacent said pipe sections together, in manner known per se, the exposed metal in the weld region on either side thereof is protected from corrosion by the following method embodying the invention.

The exposed metal surface, including the weld surface, and the outer surface of the polyethylene or polypropylene coating of the adjoining coated regions, including any exposed fusion bonded epoxy, are first thoroughly abraded. Preferably, preparation of the ends of the pipe sections united by the weld is preceded by an inspection to check the integrity of any FBE coating. Where the FBE coating is damaged, the loose material is removed. The exposed metal surface including the weld surface, the initially uncoated surface and any parts of the metal exposed by removal of loose FBE coating is prepared, preferably by abrasive blast cleaning to Sa 2½ to give a minimum surface profile of 75 microns, with adjacent areas of sound FBE being lightly flash blasted. Where such blasting is not possible, surfaces should be mechanically abraded using coarse abrasive paper or cloth, for example coarse sandpaper or carborundum paper or cloth, scarification of the surface using a toothed combing tool or a coarse wire brush. This perforation of the surfaces should ensure that the surfaces are appropriately rough and not polished. At the same time (or previously or subsequently) the exposed surfaces of the FBE coating and of the polyolefin coating (e.g. polyethylene or polypropylene) are abraded for a distance of 50 mm from the edge of the weld area to make sure this surface is completely roughened.

All abraded surfaces and adjoining portions of the unabraded coating are then de-greased using an appropriate grease solvent.

After such degreasing solvent has dried, there is then applied, to the abraded steel and plastics surfaces, a polyolefin primer, supplied under the Trade Mark Copon PPP by E. Wood Limited, of Northallerton, North Yorkshire, GB.

The Copon PPP primer is a single component solvent-based polyolefin primer which is applied as evenly and thinly as possible over the abraded surfaces, for example by brush.

After the primer has dried, the primed area is covered by a polyurethane coating compound such as that supplied under the Trade Mark Copon Hycote 165 TG by E. Wood Limited, of Northallerton, North Yorkshire, GB.

Copon Hycote 165 TG is a two component, high build, solvent free polyurethane mastic designed for application by float or trowel.

Copon Hycote 165 TG comprises a base and activator component of different colours of shades, these components being mixed together prior to use, the activator component being added to the base gradually whilst the base is stirred continuously so that the base and activator components are mixed thoroughly. On initial mixing the mix is fluid but on continued mixing the material assumes a paste-like consistency. To ensure thorough mixing, the paste is subsequently transferred to a mixing board and further mixing carried out to produce a streak free mix.

The mixed Copon Hycote 165 TG is then transferred to the primed area of the pipe joint and spread over the surface, using a spatula or "doctor blade", to substantially the same thickness as the polyolefin coating, thus providing a thickness of 2–3 mm on the weld area and 250–500 microns on the adjacent polyolefin surface.

The polyurethane coating, once it has cured, provides a tough, flexible and impermeable protective coating having excellent adhesion to the welded pipe joints and to the adjoining polyethylene or polypropylene coated surfaces.

In the following are set out the results of various tests relating to the thus-coated pipe joints.

In order for any coating system to be considered as corrosion protection for gas pipelines must pass internationally recognised tests regarding the resistance of the material to an impressed current.

When such a pipeline is put into service, the entire length of the pipe is normally protected by an applied current which is referred to as impressed current, and coating applied to the external surface of the pipe must be able to withstand an impressed current in practice without loss of adhesion or blistering.

In the U.K., British Gas have established an internationally recognised procedure which is referred to as "CW6" which defines the tests of be carried out on a particular coating when applied to a pipeline subjected to impressed current.

Initial tests have established that the polyurethane coating of the invention gave better performance in service on a pipeline under the above conditions than most epoxy coatings.

In laboratory tests, no epoxy coating was evaluated which would satisfactorily pass British Gas "CW6" specifications.

In comparison however, a number of polyurethane formulations were evaluated which were satisfactory for use in this type of situation and the Copon Hycote 165 TG formulation, based on a blend of polyester resins activated with an MDI pre-polymer, proved to be ideal from the point of view of the practical application of the material, and the ability of the material to resist an impressed current in service.

This material has been submitted to a wide range of tests and has passed every single test within the "CW6" specification.

Table 1 demonstrates the adhesion characteristics which were obtained when a film of Hycote 165 was applied to different surfaces and then allowed to cure prior to an elcometer adhesion test pull-off being carried out. The surfaces in question were (a) an un-primed polypropylene surface,
(b) an un-primed polyethylene surface and
(c) a smooth fusion bonded epoxy surface.

Table 1 shows that, in all of these tests, the Hycote 165 product failed to adhere satisfactorily to the fusion bonded epoxy surface, the polyethylene or the polypropylene.

TABLE 1

Evaluation of Copon Hycote 165 onto untreated polyethylene and polypropylene surfaces and to fusion bonded epoxy surfaces.

| Substrate | Pull off adhesion to ASTM 4541–85. FIGS. in KG/cm$^2$ |
|---|---|
| Polypropylene | 0 |
| Polyethylene | 0 |
| Fusion bonded epoxy | 140 (cohesive failure). |

A similar test was carried out in which the fusion bonded epoxy, polypropylene and polyethylene surfaces were first roughened by abrasion, the Hycote 165 being applied to the roughened surfaces, and Table 2 below shows the corresponding results.

The prior abrasion of the surfaces to which the Hycote 165 was applied did improve the adhesion of the material slightly but no great improvement was observed even where a very coarse surface profile was produced prior to the application of the Hycote 165 product.

TABLE 2

Evaluation of different methods of surface preparation on the adhesion of Hycote 165 to polypropylene.

| Preparation Method | Pull off adhesion to ASTM 4541–85. FIGS. in KG/cm$^2$ |
|---|---|
| Manual Abrasion Using 180 mesh carbide | 5KG/cm$^2$ |
| Blast Cleaning Using G24 Grit | 15KG/cm$^2$ |
| Scarification Using wire brush | 20KG/cm$^2$ |

All above figures were for adhesive failure between Hycote 165 and the polypropylene.

Table 3 identifies the results carried out in evaluating different primers applied to an unabraded polypropylene surface. It will be noted that the use of Copon PPP primer (chlorinated polyolefin primer-solvent based), significantly improved the adhesion of the Hycote 165 product.

TABLE 3

Evaluation of pretreatment primers applied to the surface of unabraded polypropylene.

| Primer | Pull off adhesion to ASTM 4541–85. FIGS. in KG/cm$^2$ |
|---|---|
| Moisture cured aromatic polyurethane primer | 5 |
| Epoxy polyamide primer solvent based | 5 |
| Epoxy polyamide primer water based | 5 |
| Chlorinated rubber primer solvent based | 7 |
| Chlorinated polyolefin primer solvent based | 40 |

All failures were adhesive failures.

However, even with the use of Copon PPP primer, the adhesion of the Hycote 165 product to smooth polyethylene or polypropylene was still not satisfactory for service on pipelines which are likely to be subjected to abuse and of course to ongoing impressed current conditions.

Table 4 illustrates the corresponding results of tests carried out to demonstrate the relative effectiveness of different types of surface preparation prior to application of a chlorinated polyolefin primer, (Copon PPP), followed by the application of Hycote 165.

TABLE 4

Evaluation of a combination of surface preparation and chlorinated polyolefin primer.

| Preparation | Pull off adhesion to ASTM 4541–85. FIGS. in KG/cm² |
|---|---|
| Manual preparing using 180 mesh silicon carbide paper | 130KG/cm² |
| Blast cleaning using G24 Grit | 135KG/cm² |
| Scarification using wire brush | 150KG/cm²* |

*Some cohesive failure noted

When the polyethylene or the polypropylene surface is thoroughly abraded prior to the application of a pre-treatment primer, then the subsequent adhesion of that primer and of the Hycote 165 system can be improved significantly.

Thus, in combination, the use of effective abrasion of the polyethylene or the polypropylene surface followed by the application of a polyolefin primer onto this surface and the subsequent overcoating with a suitably formulated polyurethane protective coating provides a system which offers outstanding adhesion to both polyethylene and polypropylene surfaces and which in practice offers significant advantages over current methods of protection.

The proposed system in accordance with the invention offers outstanding adhesion to both unheated and heated polypropylene/polyethylene surfaces.

The preferred formulation for the COPON PPP primer comprises 5% by weight of chlorinated polyolefin resin and 95% of aromatic hydrocarbons.

The preferred formulation for the base component of the Hycote 165 TG product is as follows:

| Typical formulation for the PU coating. | |
|---|---|
| Polyalcohol (hydroxyl content 5%) | 45.0 |
| Polyalcohol (hydroxyl content 7%) | 15.0 |
| Aromatic polyamine | 1.0 |
| Synthetic iron oxide | 5.0 |
| Barium sulphate | 15.0 |
| Magnesium aluminum silicate | 9.0 |
| Potassium sodium alumino silicate | 10.0 |
| | 100.0 |

The preferred activator component is polyisocyanate based on diphenylmethane diisocyanate, used in the ratio 30 parts by weight of activator to 100 parts by weight of the base component.

In summary, the preferred coating system in accordance with the invention provides good adhesion to blast cleaned steel, good adhesion to fusion bonded epoxy coatings and good adhesion to roughened polyethylene and polypropylene surfaces.

We claim:

1. A method of protecting from corrosion the junction between adjoining plastics coated metal pipes comprising roughening the exposed surface of the plastics coatings on either side of the junction region, applying a primer on the abraded region of the plastics coating, allowing or causing the primer to cure or dry, and subsequently applying over the said junction region and over the regions primed with said primer, a protective top coat wherein the protective top coat comprises a base component comprising 30 to 70 percent by weight of polyalcohol, 0.5 to 5 percent by weight of aromatic polyamine, 0 to 10 percent by weight of iron oxide, 10 to 20 percent by weight of barium sulfate, 5 to 15 percent by weight magnesium aluminium sulphate, and 5 to 15 percent by weight potassium sodium alumino silicate and an activator component comprising polyisocyanate based on diphenylmethane diisocyanate.

2. A method according to claim 1, wherein the metal surface of the pipes is exposed at the junction region and abraded, and the primer is applied over the abraded metal surface as well as over the adjoining abraded region of the plastics coating.

3. A method according to claim 1, wherein the primer comprises a chlorinated polyolefin resin dissolved in an aromatic hydrocarbon volatile solvent.

4. A method of protecting from corrosion the junction between adjoining polyethylene or polypropylene coated, metal pipes, comprising roughening the exposed surface of the polyethylene or polypropylene coating on either side of the junction region, applying a polyolefin primer over the abraded region of the plastics coating, allowing or causing the primer to cure or dry, and subsequently applying over the said junction region and over the regions primed with said primer, a protective polyurethane top coat.

5. A method according to claim 4, wherein said primer is a solvent-based primer.

6. A method according to claim 4, wherein said primer comprises chlorinated polyolefin resin and an aromatic hydrocarbon solvent.

7. A method according to claim 4, wherein said polyurethane coating is applied as an initially flowable or spreadable medium formed by mixing a liquid base compound and a liquid activator compound.

8. A method according to claim 4, wherein said polyurethane coating is a two-component, high build, solvent-free thixotropic polyurethane mastic.

* * * * *